United States Patent [19]
Dewinter et al.

[11] 3,821,662
[45] June 28, 1974

[54] SEMICONDUCTOR LASER EMPLOYING III-VI COMPOUNDS

[75] Inventors: John Christian Dewinter, Howell Township; Robert Francis Leheny, Little Silver; Robert Edward Nahory, Lincroft; Jagdeep Chandravadan Shah, Matawan; Kerry Lee Shaklee, Laurence Harbor, all of N.J.

[73] Assignee: Bell Telephone Laboratories Incorporated, Murray Hill, N.J.

[22] Filed: Nov. 2, 1972

[21] Appl. No.: 303,140

Related U.S. Application Data

[63] Continuation-in-part of Ser. No. 123,680, March 12, 1971, abandoned.

[52] U.S. Cl..... 331/94.5 H, 313/108 D, 317/235 N, 317/235 AC, 317/235 AP
[51] Int. Cl........................ H01s 3/18, H05b 33/16
[58] Field of Search............ 331/94.5 H; 317/235 N, 317/235 AP

[56] References Cited
UNITED STATES PATENTS
3,505,613   4/1970   Campbell et al. ............... 331/94.5 I

OTHER PUBLICATIONS

Abdullaev et al., "Laser Emission by GaSe...", Sov. Phys.–Semicond., Vol. 4, No. 7, Jan. 1971, pp. 1,189–1,190 (Poluprov. 1395–1397, July 70).

Karaman et al., Electroluminescence of Layered $GaS_xSe_{(1-x)}$, Sov. Phys. Semicond., Vol. 4, No. 4, Oct. 1970, pp. 662–663 (Poluprov. 783–785, 4–70).

Basov et al., Sov. Phys.–Doklady, Oct. 1965, p. 329.

*Primary Examiner*—Rudolph V. Rolinec
*Assistant Examiner*—William D. Larkins
*Attorney, Agent, or Firm*—Wilford L. Wisner; E. W. Adams, Jr.

[57] ABSTRACT

A variety of semiconductor lasers is disclosed in which III-VI semiconductive compounds are employed. Successful laser oscillation has been obtained at about 6,010 Å in gallium selenide (GaSe) by providing an optical resonator with its axis substantially parallel to the plane of the characteristic layered structure of the semiconductive compound, thereby taking advantage of the finding that the principal emission in such a compound has its electric vector orthogonal to that plane. A theoretical and experimental analysis of various mixed gallium selenide crystals, such as $GaS_xSe_{(1-x)}$ and $Ga_{(1-y)}Al_ySe$, indicates that lasers in these materials can be obtained with outputs of frequencies that span the visible spectrum and extend into the infrared.

3 Claims, 6 Drawing Figures

SEMICONDUCTOR LASER EMPLOYING III-VI COMPOUNDS

CROSS REFERENCE TO RELATED APPLICATION

This application is a continuation-in-part of my copending application, Ser. No. 123,680, filed March 12, 1971, now abandoned.

BACKGROUND OF THE INVENTION

In the semiconductor laser art, one object has been the provision of visible lasing action competitive with that achievable in gas lasers and dielectric crystal lasers.

Gallium arsenide (GaAs) semiconductor lasers in the current-injection configuration have proved to be competitive with gas and dielectric crystal lasers in the near infrared portion of the spectrum for some applications. Such lasers are particularly attractive for applications which can advantageously employ a compact battery-powered device, or in which is desired high overall efficiency or modulation of the light output directly by variation of the injected current.

Current injection to pump the lasing action is typically achieved with the aid of a p-n junction formed in the gallium aresenide crystal by the introduction of appropriate dopant impurities on either side of a junction surface or by electrodes, one of which is separated from the crystal by a thin, insulating layer known as a barrier layer.

Gallium arsenide is a III-V compound, so-called because gallium is among the group III elements and arsenic is among the group V elements of the periodic table of the elements.

In view of the success of the gallium arsenide laser, much investigation of other III-V compounds has gone forward in the search for comparable lasing action at higher frequencies. Such efforts have been largely unsuccessful in providing the desired lasing action.

Other investigations of other types of semiconductive compounds such as II-VI compounds and III-VI compounds heretofore have been similarly unsuccessful.

SUMMARY OF THE INVENTION

According to our invention, lasing action is provided in a III-VI semiconductive compound, such as gallium selenide (GaSe), by providing an optical resonator with its axis substantially parallel to the plane of the characteristic layered structure of such a compound, thereby taking advantage of the finding that the principal emission in such a compound has its electric vector orthogonal to that plane.

Specifically, lasing action has been achieved in GaSe at a wavelength of about 6,010 A (orange light). Even with a crude resonator formed by faces cut normal to the characteristic layers, the threshold for optically-pumped lasing action at 2° K was so low that such a laser should eventually be for more efficient than the gallium arsenide laser, given a comparable course of future development.

A further specific feature of our invention is based on our recognition that continuous-wave lasing action may be achieved at room temperature in compounds based on gallium selenide by a modification of the technique proven successful for the gallium arsenide laser.

Some secies of our invention employ mixed gallium selenide crystals, such as $GaS_xSe_{(1-x)}$, $Ga_{(1-y)}Al_ySe$ and $Ga_{(1-z)}Al_zS_xSe_{(1-x)}$, the particular mixture being selectable to provide emission at any visible wavelength longer than about 4,800 A (blue-green light) and extending into the infrared.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENT

Figure 1:
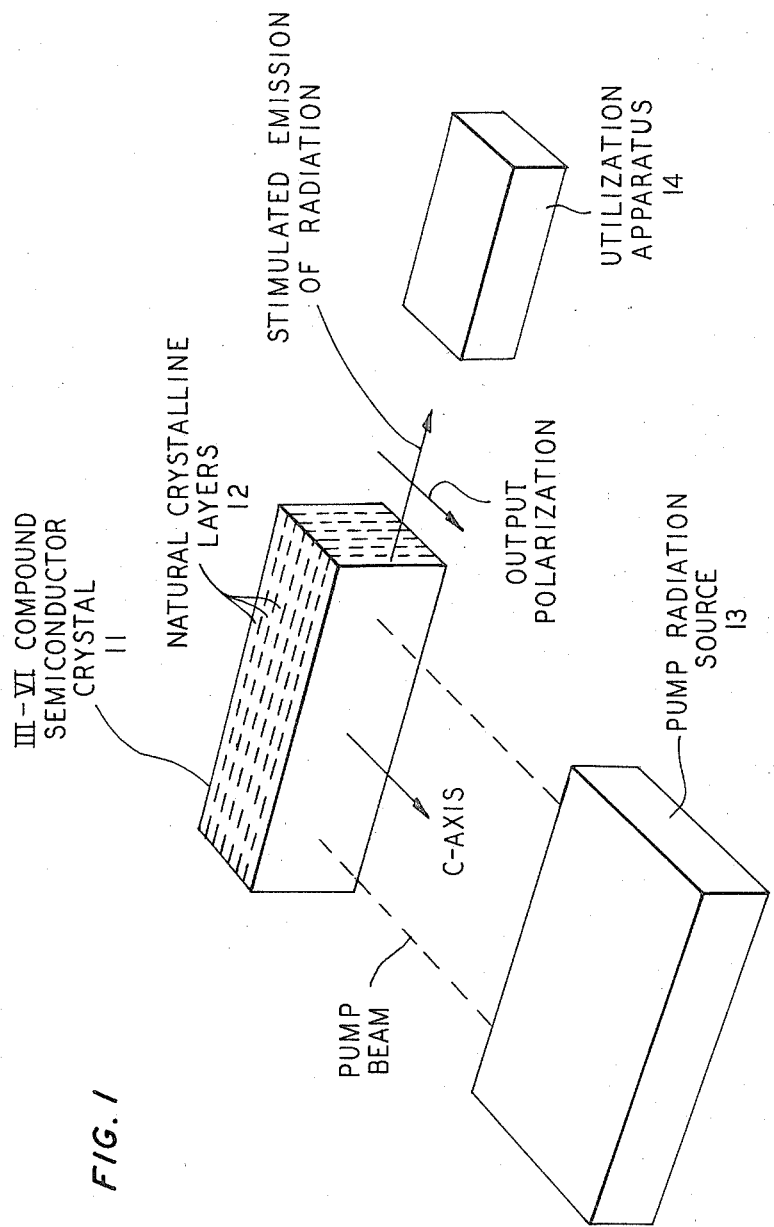
FIG. 1 is a partially pictorial and partially block diagrammatic illustration of an optically pumped embodiment of our invention.

Employing the embodiment of FIG. 1, we have observed visible stimulated emission for the first time in gallium selenide, a III-VI compound semiconductor, thus showing that a visible laser is possible in a crystal of this material, for example, the crystal 11.

In more detail, in FIG. 1, the gallium selenide crystal 11 is pumped by a pump radiation source 13 from which the radition is directed on crystal 11 orthogonal to the plane of the natural crystalline layers 12. With respect to crystalline structure, gallium selenide and the other III-VI compound semiconductors are very much like mica. The layers are about 4 atoms thick and are held together by van der Waals' forces. It will be noted that the direction orthogonal to the natural crystalline layers 12 is defined as the so-called C-axis of the crystal.

Illustratively, a utilization apparatus 14 is disposed to receive output radiation propagated in the plane of the crystal layers 12 and polarized parallel to the C-axis.

The key factor in choosing this configuration is the polarization of the electric vector of radiation with respect to the C-axis of the layer structure. It is one aspect of our discovery that the amplified light has its electric vector preferentially polarized parallel to the C-axis of crystal 11.

It may be noted that the direction of propagation in the crystal with respect to the X crystalline axis and the Y crystalline axis of the crystal, is not important since gallium selenide has a crystalline symmetry described by at least threefold rotations about the C-axis. While the layers are known to stack in different ways to form three polytypes labeled the $\gamma$, $\beta$, and $\epsilon$ modifications, the $\epsilon$ modification was used in the present work. The crystal 11 is illustratively elongated in one direction in the plane of the layers 12 as a matter of convenience.

We have found that an optical resonator can be formed by merely cutting the ends of the crystal orthogonal to the direction of elongation with a razor blade or by using as-grown faces which are orthogonal to the plane of the natural layers 12.

In an experimental operation of the embodiment of FIG. 1 employing a pulsed nitrogen laser as pump radiation source 13, and a 0.5 millimeter × 0.2 millimeter × 10.0 millimeter p-type crystal 11 with an uncompensated charge carrier concentration of about $1 \times 10^{15}$ per cubic centimeter, the stimulated emission of coherent light occurred at a wavelength of about 6,010 A units (orange light). It may be noted that all of our crystals had an unintentional copper doping of about $1 \times 10^{17}$ copper atoms per cubic centimeter. Our more successful experiments held the crystal 11 at temperature of about 2° K by mounting it in a dewar through which liquid helium was passed. The efficiency of our initial device was relatively good, as indicated by a photoluminescence efficiency of about 4 percent at low temperature and about 0.04 of a percent at room temperature.

While the pulsed nitrogen laser source 13 operated at a wavelength of about 3,300 A on a pulsed basis, it should be understood that any pump source of wavelength shorter than the bandgap wavelength could be used to pump crystal 11. It may be seen from the graph of FIG. 4 that the bandgap energy of gallium selenide is about 2.06 eV at room temperature, which corresponds to a wavelength of about 5,800 A (yellow light). Since gallium selenide has a strong exciton absorption peak at 5,880 A, any radiation of wavelength 5,880 A or shorter could be used to pump crystal 11.

Further, the embodiment of FIG. 1 can be additionally modified for operation in that optically pumped configuration by addition of various dopant impurities, such as silicon (Si), germanium (Ge), tin (Sn), chlorine (Cl), zinc (Zn), cadmium (Cd), copper (Cu), or others having comparable dopant properties. The uncompensated charge carrier concentration may vary from about $1 \times 10^{14}$ to about $1 \times 10^{19}$.

Our experimental successes in achieving stimulated emission in the III-VI compound GaSe with photon wavelengths at about 6010 A have led us to investigate, experimentally and theoretically, various mixed crystals of the III-VI compound, such as $GaS_xSe_{(1-x)}$, $Ga_{(1-y)}Al_ySe$, and $Ga_{(1-z)}Al_zS_xSe_{(1-x)}$. We have concluded that these materials should likewise provide efficient stimulated emission at various wavelengths in embodiments such as the embodiment of FIG. 1.

For example, for the ternary III-VI compound $GaS_xSe_{(1-x)}$, an analysis of the published photoluminescence and absorption spectra data allows us to predict the range of sulphur concentration $x$, for which this material is expected to have its direct bandgap less than its lowest indirect gap. The principle feature investigated to make such a prediction is the separation between the exciton peak observed in the absorption spectra of the material and the highest energy luminescence peak. It is well known that the exciton peak corresponds to absorption at the minimum of the direct gap even when the indirect gap has lower energy. This fact is a result of the "$k$" selection rules that make radiative transitions to the direct gap allowed, while the lower energy transitors to the indirect gap are nonallowed and, consequently, can contribute little to the absorption. On the other hand, when the lowest energy gap is indirect, all excited electrons rapidly relax into this lowest energy point of the conduction band, from which they then relax by phonon assisted emission of photons (as well as by nonradiative decay). As a result, the highest energy luminescence peak can be associated with the indirect bandgap energy when this energy lies below the direct gap energy.

For an excellent discussion of the energy level characteristics of semiconductive materials and of the processes of absorption and emission of radiation therein, which discussion should be helpful in understanding the foregoing analysis, reference is made to a book entitled Lasers, Second Edition, by Bela A. Lengyel (John Wiley & Son, Inc. 1971) pages 203–215.

Based upon the foregoing analysis, we have investigated the photoluminescence and absorption data for a number of different $GaS_xSe_{(1-x)}$ samples with $0 \leq x \leq 1$. The pertinent data has been published by M. I. Karaman and V. P. Mushinskii in Volume 4 of Soviet Physics — Semiconductors, page 464 (1970). We make reference to FIG. 1 of that article, in which the photoluminescence and absorption data is plotted for $GaS_xSe_{(1-x)}$ for a wide range of $x$.

Figure 6:
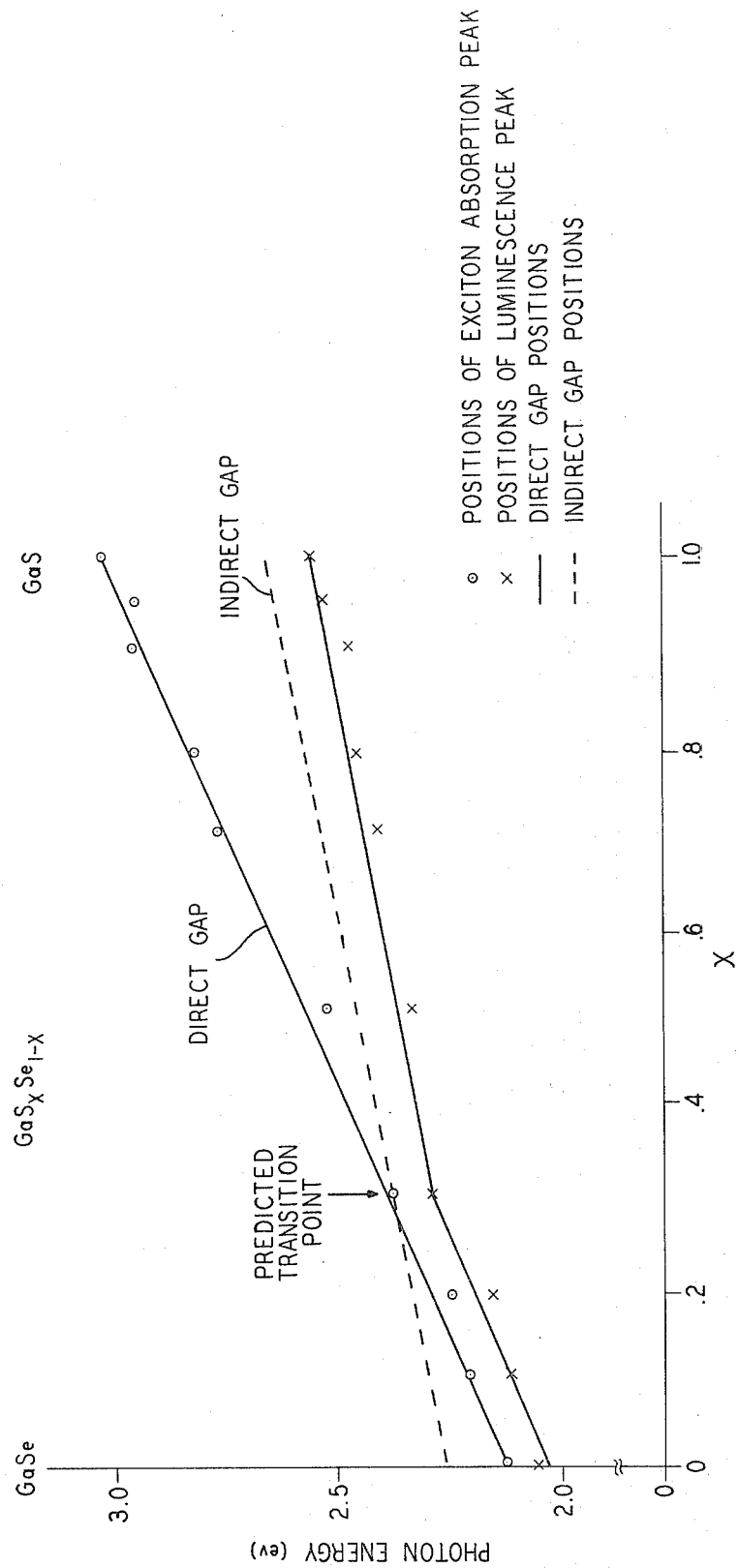
FIG. 6 is a plot useful in understanding the operation of embodiments of our invention employing, as active media, mixed gallium selenide crystals.

In FIG. 6 of the accompanying drawing hereof, based upon the data of the above-mentioned Karaman article, we plot the energy of the direct exciton peak observed in the absorption spectra of $GaS_xSe_{(1-x)}$ as a function of $x$. Also plotted is the peak energy of the highest energy luminescence. It is noted from FIG. 6 that at $x$ equal to about 0.3, there is an abrupt change of slope in the luminescence data. We take this value of $x$ to be the transition from direct to indirect bandgap in the material. The plotted curves of FIG. 6 show the estimated energy of the indirect gap taking account of the energy of the phonon necessary to satisfy momentum conservation. The experimental data we have obtained with the $GaS_xSe_{(1-x)}$ crystals is in good agreement with these results.

On the basis of this investigation, we have concluded that the usual type of semiconductor laser, operating in some fashion on direct band-to-band radiative recombination, can be obtained in mixed crystals of $GaS_xSe_{(1-x)}$ for $x$ up to about 0.3. Stimulated emission at photon energies between about 2.06 and 2.4 eV (with the corresponding wavelengths being between about 6,010 A and 5,160 A at 2°K) should be possible in these materials. For $GaS_xSe_{(1-x)}$ crystals with sulphur concentrations greater than $x$ equal to about 0.3, special procedures would typically be required to achieve laser action. One such procedure is described in co-pending application Ser. No. 187,631, now U.S. Pat. No. 3,761,837 filed Oct. 8, 1971, and assigned to the assignee hereof, in which indirect bandgap semiconductive laser crystals are doped with isoelectronic traps.

Equally interesting III-VI mixed crystal systems, which should be useful in the various embodiments of our invention, are gallium aluminum selenide ($Ga_{(1-y)}Al_ySe$) and gallium aluminum sulfide selenide ($Ga_{(1-z)}Al_zS_xSe_{(1-x)}$).

In the analogous field of III-V semiconductive compounds, it has been shown that, by combining various of these compounds in solid solution, a number of mixed III-V crystal systems can be formed which make it possible to produce direct bandgap semiconductors with a continuous range of energy gaps. Particularly, subsequent to the successful operation of a laser in GaAs, probably the best known III-V compound, it was shown that mixed crystals of the form $Ga_{(1-x)}Al_xAs$ could be satisfactorily grown to have direct gaps for various values of $x$, and, consequently, were useful laser materials. See, for example, Volume QE—6 of the IEEE Journal of Quantum Electronics, page 278 (1970) and Volume 18 of Applied Physics Letters, page 403 (1971). It was noted that the aluminum atom had an atomic radius approximately equal to that of the gallium atom and that, therefore, mixed crystals which involved the partial substitution of the gallium atoms with aluminum atoms could readily be fabricated with little change in the lattice of the GaAs system.

For the same reasons, we have concluded that partial substitution of the gallium atoms with aluminum atoms in the III-VI semiconductive compounds GaSe and $GaS_xSe_{(1-x)}$ is possible and that mixed crystals such as $Ga_{(1-y)}Al_ySe$ and $Ga_{(1-z)}Al_zS_xSe_{(1-x)}$ should have direct bandgaps for various values of $y$ and $z$, spanning the visible spectrum. Our estimates are that these materials have direct bandgaps for values of $x$, $y$ and $z$ up to 0.3 or larger.

Thus, it should be evident that, in the III-VI class of semiconductors, one can find a particular mixed crystal system and particular composition to give a wide range of colors as an output in the various embodiments of our invention.

The principles of our invention also extend to current-injection-type semiconductor laser devices, based on our observation of visible electroluminescence from gallium selenide Schottky diodes operated at low temperatures. While the Schottky diode configuration will be discussed hereinafter in connection with FIG. 3, a generally more interesting current-injection device is shown in FIG. 1.

Figure 2:
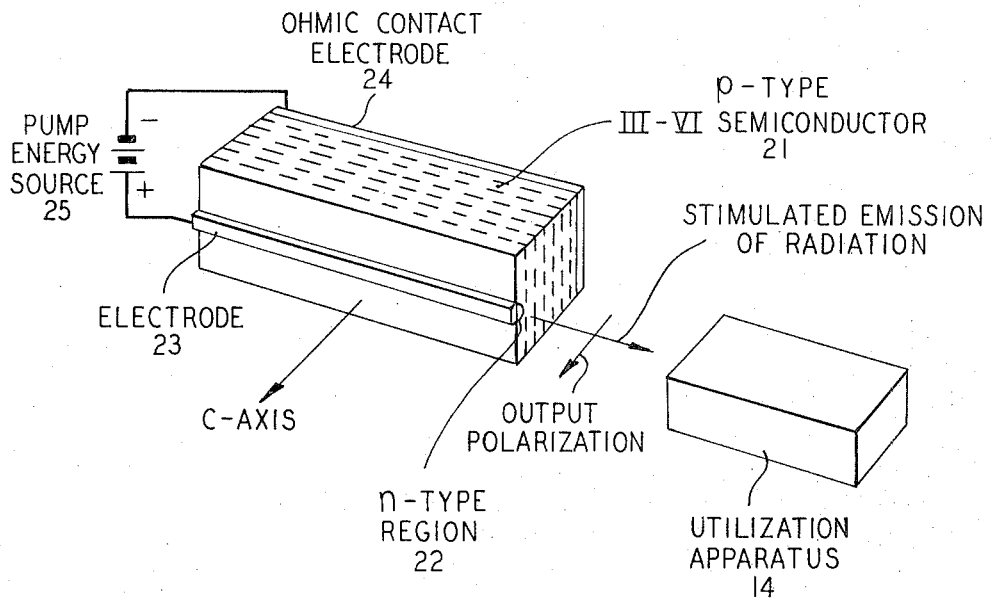
FIG. 2 is a partially pictorial and partially schematic illustration of a p-n junction embodiment of our invention.

In FIG. 2 the p-type III-VI semiconductor crystal 21 is cut as in the embodiment of FIG. 1 and is provided with a p-n junction by diffusing into a major surface of the crystal an appropriate donor dopant impurity to form the n-type region 22. A suitable electrode 23 is placed only over the n-type region 22 and another electrode 24 makes ohmic contact to the back major surface of crystal 21. The pump energy source 25, illustratively a source of direct-current voltage, is connected between electrodes 23 and 24 with its positive terminal connected to electrode 23.

In operation, the voltage supplied by source 25 shifts the bands of carriers in the n-type region 22 and in the nearby portions of p-type material to forward-bias the junction so that electrons are injected from region 22 into the p-type material where they recombine with holes to produce the photons of light at about 6,010 A. The emission of radiation attributable to these recombinations becomes stimulated by the action of the optical resonator formed by the two end surfaces orthogonal to the direction of elongation of the n-type region 22.

In other respects, the structure and operation of the embodiment of FIG. 2 are similar to that of FIG. 1.

A reverse-biased mode of operation, in which avalanche breakdown occurs is also feasible in the embodiment of FIG. 2. In that case, the polarity of source 25 would be reversed.

The Schottky diode device mentioned above may be fabricated as shown in FIG. 3.

A p-type crystal 31 of a III-VI compound semiconductor of the dimensions and doping level employed in FIGS. 1 and 2 has applied to one major surface thereof a strip of insulating material to form the barrier layer 32 on which the electrode 33 is placed. The barrier layer 32 may illustratively be a layer of gallium oxide or other dielectric material with thickness in the range between about 50 A and 500 A. It may be noted that gallium oxide layers tend to occur naturally on the major surfaces of gallium-containing III-VI compounds as an inherent byproduct of the growth process. Growth techniques will be discussed more fully hereinafter. As in the previous device, the ohmic contact electrode 34 is applied to the opposite major surface of crystal 31; and the dc voltage source 35 has its negative terminal connected to electrode 34 and its positive terminal connected to electrode 33.

In operation, the effect of the voltage source 35 is to promote tunneling by charge carriers through the barrier layer 32 so that they are injected through the potential barrier provided by layer 32. The stimulated emission of radiation take place in the underlying material because the end surfaces of the crystal 31 form an optical resonator for the light emitted in this region.

Figure 3:
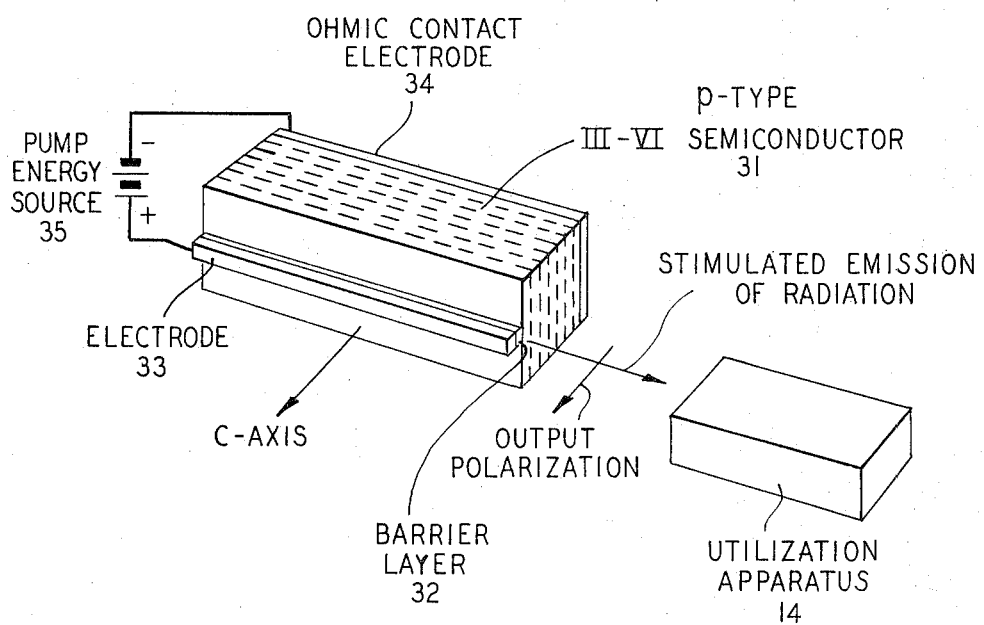
FIG. 3 is a partially pictorial and partially schematic illustration of a modified embodiment of our invention employing current injection through a barrier layer.

In other respects the structure and operation of the embodiment of FIG. 3 are similar to the structure and operation of FIGS. 1 and 2.

In each of the foregoing embodiments, the device can be used as a laser amplifier in which case the coherent emission is stimulated by the input light to be amplified.

Figure 4:
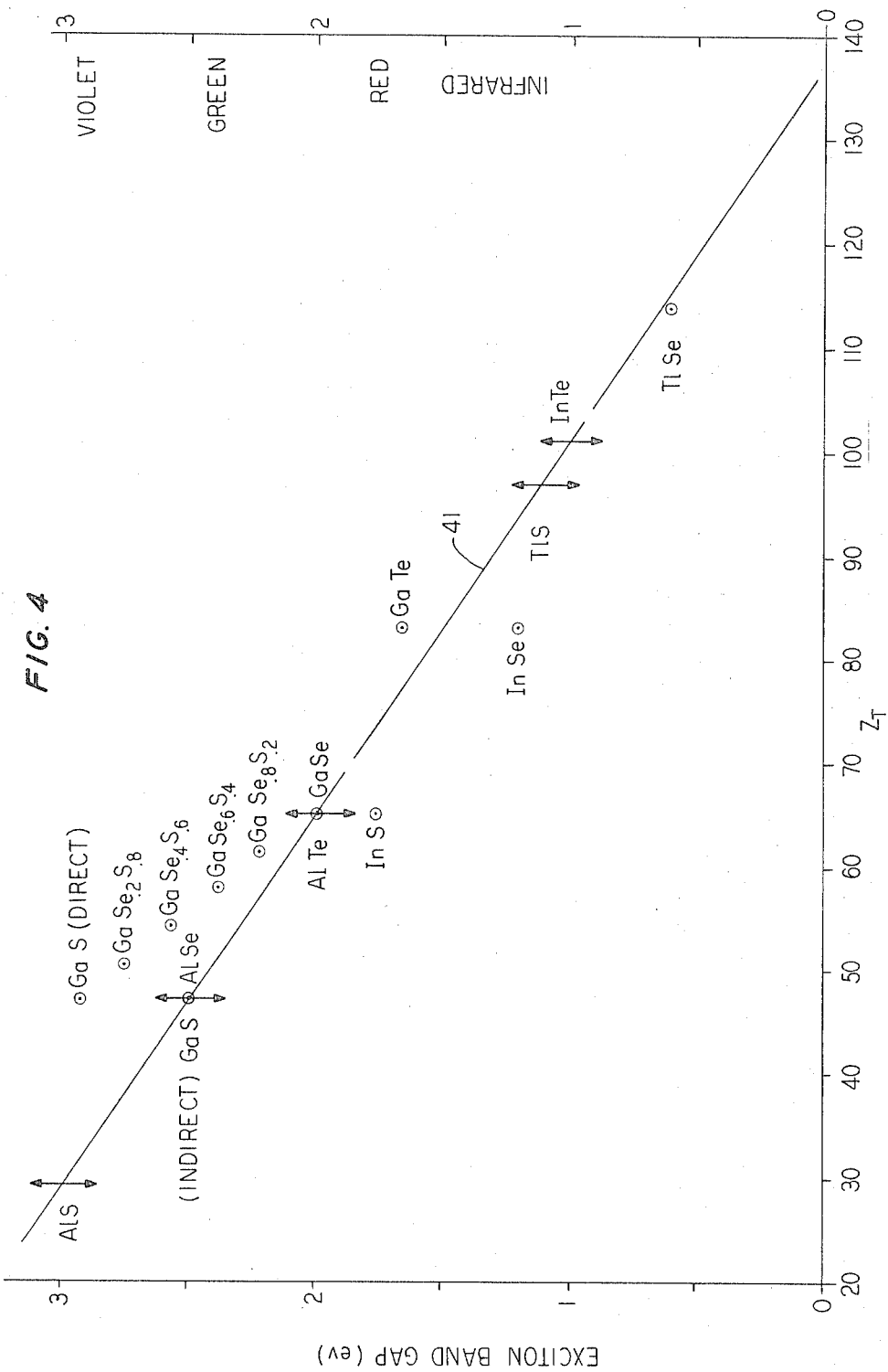
FIG. 4 shows graphically many of the bandgap energies of III-VI compounds and the overall trend thereof.

It may be seen from the graph of FIG. 4 that all three of the foregoing embodiments of the invention may be modified for operation at different visible light wavelengths by appropriate substitution of a III-VI compound semiconductor for that specifically described. In FIG. 4, the lightweight line 41 indicates the trend of the exciton bandgap energies of the labeled compounds versus the total atomic number, $Z_T$, representative of the particular compound. The bandgaps of some III-VI compounds are not known, for example, those of aluminum sulfide, aluminum selenide, aluminum telluride, thallium sulfide and indium telluride. The vertical arrows locate the values of total atomic number for these five little-studied materials; and their bandgap value should be in the neighborhood of the line 41 and within approximately the limits of the length of the vertical double-headed arrows.

In all instances except one, only direct bandgaps are plotted in FIG. 4. The one exception is the indirect gap for gallium sulfide, which may determine the effective electronic nature of that material. That is, while gallium sulfide seems to have an indirect gap for purposes of devices such as those shown in the embodiment of our invention, it must be remembered that such a prediction had previously been erroneously made for gallium selenide. Aluminum sulfide may also have such an indirect gap. Nevertheless, as previously pointed out, our calculations and experimental investigations to date clearly indicate that mixed crystals of gallium sulfide selenide ($GaS_xSe_{(1-x)}$), gallium aluminum selenide ($Ga_{(1-z)}Al_zSe$) and gallium aluminum sulfide selenide ($Ga_{(1-z)}Al_zS_xSe_{(1-x)}$) have direct bandgaps for values of $x$, $y$ and $z$ up to about 0.3 or larger. Such mixed crystals would provide a direct bandgap suitable for light emission of wavelength as short a about 4,800 A (blue-green light).

Our crystals, grown from a melt using a conventional Bridgman technique, were p-type with hole concentration $p = 1 \times 10^{15}$ per cubic centimeter approximately and mobility equal to 20 cm² per volt-sec. at room temperature. Our crystals had an unintentional copper doping of about $1 \times 10^{17}$ copper atoms per cubic centimeter. A pumping surface was prepared by cleaving the crystal parallel to the natural crystalline layers. End surfaces were cut parallel to form the resonator.

In general, all of the foregoing crystals are very readily grown by many methods, including growth from the melt, which has been our method thus far, or in a Czachrowski puller or by vapor transport.

Gallium aluminum selenide has the advantage that it can be grown by liquid phase epitaxy technology analogous to that previously developed for gallium aluminum arsenide and gallium aluminum phosphide systems.

Figure 5:
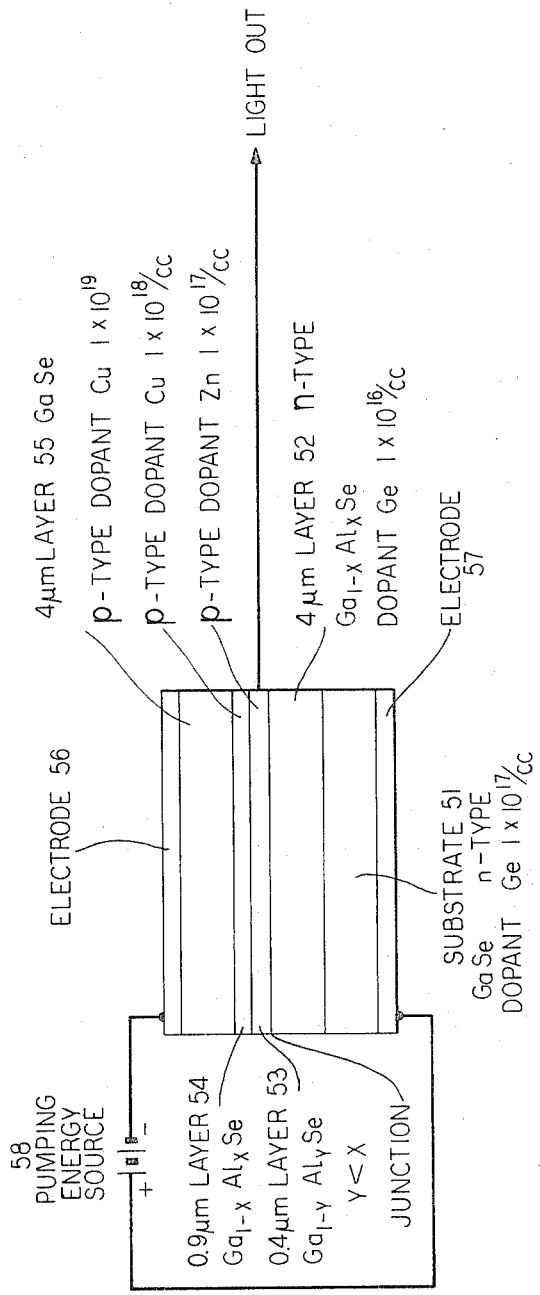
FIG. 5 is a partially pictorial and partially schematic illustration of a heterojunction device according to our invention.

A broad application of liquid phase epitaxy is shown in FIG. 5 and may be particularly useful for continuous-wave operation at or above room temperature, as has already been obtained by I. Hayashi in GaAs-GaAlAs, as disclosed in the copending patent application Ser. No. 33,705, now U.S. Pat. No. 3,758,875 filed May 1, 1970 and assigned to the assignee hereof. Indeed, it is one of the advantages of the present invention that all of the detailed technology applicable to gallium arsenide type devices can now be made applicable to III-VI compound semiconductors.

In the illustrative example of FIG. 5, the starting material is a substrate layer 51 of n-type gallium selenide containing germanium as a dopant impurity at an effective concentration of about $1 \times 10^{17}$ per cubic centimeter. Thereover is epitaxially deposited a 3.6 micrometer layer 52 of n-type gallium aluminum selenide ($Ga_{1-x}Al_xSe$) doped with germanium as a dopant impurity to a concentration of about $1 \times 10^{16}$ per cubic centimeter. It should be understood that the foregoing carrier concentrations are merely illustrative and not necessarily preferred.

Next, a 0.4 micrometer layer 53 of gallium aluminum selenide ($Ga_{1-y}Al_ySe$) is epitaxially deposited. This layer 53 is the region of radiative recombination and stimulated emission of radiation and is doped with zinc to be p-type with an effective hole concentration of about $1 \times 10^{17}$ per cubic centimeter. The next layer epitaxially deposited is a 0.9 micrometer layer 54 of essentially the same composition as that contained in layer 52 except that the layer is doped with copper to be p-type. The dopant concentration is illustratively about $1 \times 10^{16}$ per cubic centimeter.

The final 3.6 micrometer thick layer 55 is epitaxially deposited gallium selenide also doped with copper at a somewhat greater effective level than layer 54. An electrode 57 is deposited on the exposed surface os substrate 51 parallel to the natural crystalline layers thereof and electrode 56 is deposited on the exposed major surface of the final epitaxial layer 55, also parallel to the natural crystalline layers. Pumping voltage source 58 is connected between electrodes 56 and 57 with its positive terminal connected to electrode 56.

It will be noted that the epitaxially-deposited layers automatically assume the same orientation of the C-axis as exists in the substrate 51. Therefore, proper orientation of the layers is obtained by the appropriate cutting and masking of the substrate crystal 51 prior to the epitaxial growth steps.

The structure shown in FIG. 5 and described above may be called a double heterostructure injection laser.

It appears to be promising for a continuous-wave laser action at room temperature with relatively low thresholds. It should be noted that in order to obtain both confinement of the injected carriers in the recombination region, e.g., layer 53, and light guiding in that layer, the value $y$ in the chemical proportions should be less then the value $x$. Under these conditions the layer 53 will have the highest index of refraction, as needed for light guiding, and will have a lower bandgap energy than the immediately adjacent layers, as is needed for minimum attenuation of the guided light. Further, it has already been shown in the above-cited application of Hayashi that the electrons injected into layer 53 are effectively trapped there in a potential well until they recombine with holes and yield recombination radiation.

It is believed to be an advantage in the doping of the epitaxial layers of the device of FIG. 5, as compared to the prior art gallium aluminum arsenide heterostructures, that group IV impurities in a III-VI compound semiconductor are not amphoteric. Thus, a group IV element, such as germanium, will always substitute only for the group III element in devices according to our invention. For this reason, germanium can advantageously be used as a dopant in both layers 51 and 52, thereby facilitating fabrication of the device and minimizing the number of different dopants that need be used. In contrast, in the prior art gallium aluminum arsenide devices, a larger number of dopant impurities were needed because some of those impurities are amphoteric, that is, a group IV dopant could substitute for either Ga or As in the crystalline lattice.

A further advantage of our invention derives from the mica-like flexibility of its natural crystalline layers. Because of this flexibility, integrally-bonded heat sinks are not needed, in contrast to the prior art devices. Simple contact heat sinks are sufficient. For example, a sapphire heat sink may be placed on top of one of the electrodes 56 and 57 with merely a thin layer of a silicone grease therebetween (not shown). The flexing of the natural crystalline layers makes possible contact throughout the surface area between the electrode and any exposed surface of the III-VI semiconductor device and the heat sink.

The following further modifications of the foregoing devices may be mentioned. The barrier layer 32 of barrier layer devices according to out invention could be replaced with a layer of compensated material of the same or similar composition to the underlying material, a layer of silicon dioxide or a natural surface depletion region formed in part by the applied electric field. Each of these can provide a suitable potential barrier. Moreover, in all cases current injection type devices can be made thinner than that of FIG. 5, or any portion thereof can be made thinner, with heavier doping than that described above.

A thin light-guiding layer 53 would make the device of FIG. 5 particularly suitable for a laser amplifier. The light to be amplified would be focused into layer 53 from the left and would replace the optical resonator as the measns for stimulating the emission of coherent radiation. Therefore, the entrance and exit surfaces could be cut at Brewster's angle with respect to the plane of layer 53.

Also, in general, mixed crystals not specifically discussed herein can be used and will typically have a direct bandgap lying near the curve 41 of FIG. 4. The appropriate value of $Z_T$ is determined by weighting the atomic number of each constituent portion of the mixed crystal according to its subscript and then adding the weighted atomic numbers for the entire compound.

We claim:

1. A semiconductor laser comprising a crystal including a III-VI semiconductive compound selected from the group of compounds consisting of GaSe, $GaS_xSe_{(1-x)}$, $Ga_{(1-y)}Al_ySe$ and $Ga_{(1-z)}Al_zS_xSe_{(1-x)}$, said selected compound having a characteristic layered crystalline structure of which the major surfaces are parallel to a first plane, means for providing an optical resonator encompassing at least a portion of said crystal and having an axis within said compound substantially parallel to said first plane, and means for optically pumping said crystal with radiation incident substantially normal to said first plane to enable the stimulated emission of coherent radiation via a radiative transition of said compound.

2. A semiconductive laser according to claim 1 in which the pumping means comprises means for supplying into said crystal optical pumping radiation having a wavelength shorter than the bandgap wavelength of said crystal.

3. A semiconductor laser comprising a crystal consisting essentially of gallium selenide having a characteristic layered crystalline structure of which the major surfaces are parallel to a first plane, means for providing an optical resonator encompassing at least a portion of said gallium selenide in said crystal and having an axis within said gallium selenide substantially parallel to said first plane, and means for optically pumping said crystal with radiation incident substantially normal to said first plane to enable the stimulated emission of visible coherent radiation via a radiative transition of said gallium selenide.

* * * * *